Aug. 22, 1967  D. J. KRAMER  3,336,669
PROCESS OF PREPARING AND PRODUCING DENTAL CEMENTS FOR
ASSURING ACCURATE CHEMICAL BALANCE OF INGREDIENTS
Filed March 27, 1964
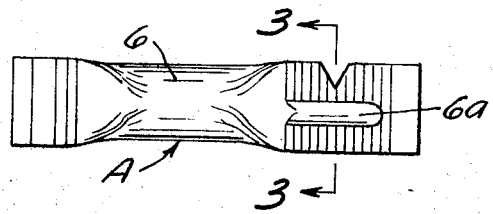
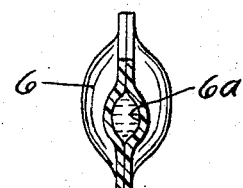
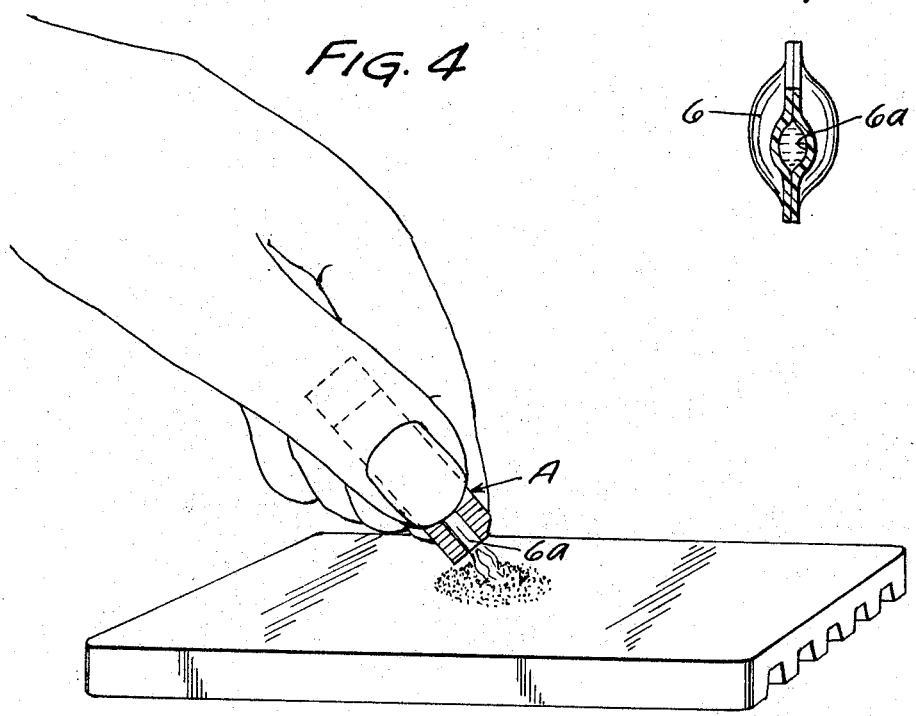
INVENTOR
DOUGLAS J. KRAMER
BY
Williamson & Palmatier
ATTORNEYS

United States Patent Office 3,336,669
Patented Aug. 22, 1967

3,336,669
PROCESS OF PREPARING AND PRODUCING DENTAL CEMENTS FOR ASSURING ACCURATE CHEMICAL BALANCE OF INGREDIENTS
Douglas J. Kramer, Minneapolis, Minn., assignor to Kramer Dental Studio, Inc., Minneapolis, Minn., a corporation of Minnesota
Filed Mar. 27, 1964, Ser. No. 355,190
2 Claims. (Cl. 32—15)

This invention relates to a process or method for most beneficially preparing and producing dental cements to assure accurate chemical balance and requisite compressive strength of the spatulated cement product.

Classification of dental cements comprises as the most common, zinc phosphate (used primarily as gluing agent for fabricated restorations); zinc phosphate with copper or silver salts added (generally used for temporary fillings; and root canal fillings); copper phosphate (for temporary fillings and heat insulating base); silicate or synthetic porcelain (for tooth restorations and gluing agents for porcelain restorations); zinc phosphate-silicate (for gluing agent for fabricated posterior restorations); and acrylic resin cement (for gluing agent and for temporary fillings).

In the production of all these cements, a quantity of powder of requisite particle size comprising one or more solid ingredients, often salts, is combined with an unstable liquid, generally of acidic nature, to produce a resultant chemical reaction or reactions at the dentist's office or laboratory and the said ingredients are thoroughly and quickly admixed by spatulation and the mixture immediately thereafter applied to the prepared cavities, roots or fabricated restoration.

In all of the above enumerated dental cements the powder consisting in one or more ingredients is generally hydroscopic in nature and often subject to oxidation so that exposure to moisture or air, even in capped bottles or containers, will change the desired chemical constituents. In the case of the unstable liquid, alteration, dilution or oxidation is even more serious and presents great problems to the dental laboratory or dentist who from time to time must quickly spatulate the essential ingredients, powder and liquid from sources at hand in his laboratory.

As exemplary of all of the aforementioned dental cements I shall in some detail analyze the ingredients, physical properties and chemistry of two of the most frequently used dental cements to wit, zinc phosphate cements and silicate cements.

Zinc phosphate cements

A number of pharmaceutical houses in the United States manufacture both the powder and unstable liquid for zinc phosphate cements and these vary in precise composition of ingredients, but have considerable in common. The chief difference between the powder ingredients is that a number of standard manufacture contain zinc oxide almost exclusively, some contain an oxyphosphate of zinc, almost exclusively, and some contain one or the other or mixtures of the two first mentioned ingredients with modifiers in the form of a small proportion of magnesium oxide or additional modifiers in small proportion including silica, rubidium trioxide and bismuth trioxide. One or more, as a buffer, contain a small amount of barium sulfate.

Chemical analysts of the unstable liquids of standard manufacture for chemical reaction with the corresponding powders, show that the liquids are essentially phosphoric acid, aluminum phosphate and in some cases, zinc phosphate. The metallic salts are added as buffers to reduce the rate of reactivity of the liquid with the powder. The average water content of the liquids is $33 \pm 5\%$. The amount of water present is a factor in control of the ionization of the liquid, and may be critical in the rate and type of the liquid-powder reaction. When a zinc oxide powder is mixed with phosphoric acid, a solid substance is formed rapidly with a considerable evolution of heat. The exact nature of the product of the reaction is not known but it is generally thought that tertiary zinc phosphate $[Zn_3(PO_4)_2 \cdot 4H_2O]$ is formed. The following principle reaction probably takes place:

$$ZnO + 2H_3PO_4 \rightarrow Zn(H_2PO_4)_2 + H_2O$$

Any magnesium oxide present in the dental cement powder probably reacts in a similar manner to form ultimately a tertiary magnesium phosphate $$[Mg_3(PO_4)_2 \cdot 4H_2O]$$

Both of said tertiary phosphates (zinc and magnesium) are quite insoluble in water. The final product is crystalline in structure with some undissolved powder particles suspended in the crystals of the zinc phosphate and other reaction products. The undissolved powder particles are called the core and the crystalline phase in which they are suspended is called the matrix.

The consistency of the mix which is determined by the amount of powder that is incorporated into a given amount of liquid, governs the values for the pertinent physical properties. Compressive strength of the ultimate hardened product is important and a relatively high strength (12,000 pounds per square inch minimum) under oral conditions, is considered desirable in the established standard method adopted by committees set up by American Dental Association.

From the foregoing it will be readily seen that deterioration dilution, modification or oxidation of the unstable liquid mixture or composition, or of the powdered ingredients, will materially affect the ultimate composition, compressive strength, and morphology of the finished product.

In the past, some efforts have been made to assure uniformity of the zinc cement liquids with a view to obtaining improved chemical balance of the powder and liquid ingredients, and to provide for better mixing and setting times. For example, containers for the liquid have utilized improved stoppers and in instances, an oil film has been deposited upon the liquid cement kept in a closed bottle with an eyedropper, the tip of which is well below the oil film when the liquid is withdrawn. Such artifices have only provided slight improvements because each time the dropper is withdrawn through the oil film, air and moisture within the upper part of the bottle, is to some extent admitted to the cement-liquid below the film, and the dropper itself in expelling liquid takes in air to the extent of the volume previously occupied therein by the liquid. Furthermore, measurement by drops from an eyedropper is not adequately accurate. In other instances, a syringe-ejecting instrument has been combined with capped containers or Carpules filled with the cement liquid, with graduations and a stop for limiting successive ejections. However, in each ejection and even in associating the piston ejector with the container, some slight presence of air in the cement liquid occurs and the utilization of such devices requires very careful and skilled manipulation, which often does not occur in the dentist's office or even in the dental laboratory.

Dental silicate cements

The powders of the silicate cements are pulverized, complex glasses constituting essentially alumino-silicates containing magnesium, fluorine, calcium, sodium and phosphate. They are quite stable but have hydroscopic properties. The frequently used modern silicate cement powders contain substantial quantities of fluorides, some having as much as 15% by weight of the fluorine.

All of the liquids of currently used silicate cement are aqueous solutions of phosphoric acid buffered by the addition of aluminum or zinc salts or both. Their water content runs about 40±5%, which is higher on average than liquids used with zinc phosphate cement. The liquids have pH of approximately 2. A "neutralized" or "more than partially neutralized" silicate cement liquid does not exist. Such liquids, when exposed to air, gain or lose water depending upon the relative humidity of the air and tend to come into equilibrium wtih the water vapor of the air. It is thus exceedingly difficult to prevent changes in the water content of the liquid and with this in view, the eyedropper technique and oil film top float previously described relative to a zinc phosphate cements, have been employed but are far from successful in maintaining uniformity of the liquid composition.

An object of my invention is the provision of a simple, accurate and fool-proof process of producing from available approved powders and chemically reactive liquids for the various dental cements, an admixture and compound cement wherein precise chemical balance of the chemical substances which react when mixed is assured and which overcomes the uncertainties, inaccuracies and deterioration of the requisite ingredients now prevalent in preparation of dental cements as set forth heretofore in this specification.

More specifically, it is an object to provide a process of the class described wherein for the production of the various and sundry dental cements requiring as the principal chemical-combining ingredients, a powder and an unstable liquid, the steps include the packaging of both essential ingredients, powder and liquid in pure form and under packaging conditions which will positively exclude presence of air, moisture or other deteriorating elements upon the said ingredients or the interior of the packages therefor. My process includes the selection and use of very small containers for each unit of the two ingredients, constructed of flexible, gas and moisture-impervious materials which will withstand long storage and shelf periods without deterioration, cracking or weakness, and each of which is of such a nature that the full contents may be easily and almost instantly expelled upon a smooth mixing surface such as a tile or glass slab and immediately spatulated or otherwise intimately admixed in one small location. My process further includes the precise measurement during packaging of the powder and unstable liquid ingredients of the precise amount of the particular powder ingredient utilized for accurate chemical balance with a precise predetermined quantity of the particular liquid employed which is also precisely measured in such relation as packaged in its container.

The selection and provision of the most efficient containers for both powder and liquid ingredients is important from the standpoint not only of proper containment of the respective ingredients with impossibility of contamination from air, moisture or gases, during prolonged storage periods, exceeding two years or more, but also from the standpoint in each case of enabling the user, such as the dentist or technician to without any calculations or the use of high technical skill immediately expel the contents of both containers and spatulate or otherwise admix the powder and liquid ingredients in one small area. Thus chemical reactions between the ingredients, are substantially instantaneously started throughout the small amount of the mix assuring the most accurate and effective chemical reactions during mixing and subsequent setting of the compound in situ (in the patient's mouth or upon the bridges or other restorations being made). Such accuracy results in cement products setting to the most efficient compressive strength and morphology.

The foregoing objects and advantages will be more apparent from the following description made in connection with the accompanying drawings wherein:

FIG. 1 is a perspective view of an entirely satisfactory container readily separable for quickly expelling the powder ingredients;

FIG. 2 is a plan view of a special, flexible plastic ampule heat sealed and impervious to air, moisture and gases throughout its interior, including its dispensing passage or sprue for packaging and containment of the liquid ingredient in the precise, predetermined quantity for chemical balance with the powder ingredient;

FIG. 3 is a cross section of the ampule of FIG. 2 taken on the line 3—3 of FIG. 2; and FIG. 4 is a perspective view illustrating in the production of the cement, the contents of the powder-container dispelled upon the surface of a mixing slab while the contents of the liquid ampule are being expelled.

While I in no way limit myself to the use of conventional two-part plastic capsules of material impervious to moisture air and gases, I prefer to use the two-part telescoping capsule C illustrated because it is available at lower cost than ampules or automatically filled and heat-sealed plastic packages.

It is important that the source of the powder mixture utilized for filling the capsules of predetermined size, be uniform as to ingredients and as to particle size so that bulk density in the capsule is always constant.

It is further desirable in filling of the capsules C, that the source of powder is withdrawn from a fresh sealed larger drum and the contents completely utilized, eliminating danger of contamination or moisture absorption. Preferably the capsules are filled in an atmosphere of an inert gas such as nitrogen.

I have determined for an approved "zinc phosphate" powder of a standard particle size approximating 200 mesh for the average particle, and for its available and approved combining-liquid containing mostly phosphoric acid with some buffering agent, that predetermined amounts of said powder and said liquid constitute approximately one half gram of powder in each capsule for .025 cc. of the liquid. I have sought out and experimented with various flexible, usually plastic containers for the unstable liquid which may be sequentially formed and filled in tubular strip form and prefer the specific construction illustrated in FIGS. 2, 3 and 4 of the drawings, which lends itself to continuous filling and sealing of the individual ampules in continuous readily severed strip form, made of a plastic such as fluorocarbon which is impervious to moisture, air or other gases, will not be affected by the fumes of most acids, which has great tensile strength and will not crack or harden in a temperature range between plus 200 degrees F. and minus 20 degrees F. This ampule with the measured liquid therein has an effective storage or shelf life in excess of three years.

It will of course be understood that my invention contemplates the use of equivalent materials which may include saran or Teflon to carry out the steps of my process.

As previously recited, the pure liquid ingredients taken from fresh hermetically sealed containers are very rapidly inserted into the moving and successively filled and sealed strip through the use of known automatic machinery, all filling and sealing taking place in a surrounding atmosphere of an inert gas such as nitrogen, wherein moisture, air and any deteriorating vapors or gases are excluded.

In the preferred form of ampule employed for containing my units of liquid, it will be noted that the individual ampule A comprises an interior larger chamber 6 with a communicating expelling passage or sprue 6a of smaller cross sectional dimension. It will also be noted that each ampule is hermetically heat-sealed throughout a wide area at its rear end constituting the flattened portion 7 and is also heat and hermetically sealed throughout an even wider area at its forward or dispensing end resulting in the flattened portion 8 which has a laterally disposed tearing notch provided, for facilitating tearing or shearing of the individual unit capsule from a continuous strip.

In utilizing my specially prepared ingredients which constitutes the last steps of my process, any suitable mixing slab, preferably one having a glazed surface is employed, preferably being previously chilled to a house refrigerating temperature. The two ends of the capsule C are quickly pulled apart and the contents of each section completely expelled by shaking, tapping and pressure in a neat small pile upon the slab. Immediately thereafter the sealed forward end 8 of the liquid ampule is severed opening the spout 6a and the flexible ampule is instantly compressed from rear to forward extremity expelling substantially the entire contents thereof upon the small pile of powder ingredients. Spatulation or other thorough admixing of the powder and liquid ingredients is immediately performed upon the slab, requiring only a few seconds, thereafter the dentist or technician applies the produced cement in standard approved manners to the particular cavity, recess or surfaces of the restorative or other parts to be joined with bridging and other dental work.

Application of the cement should be started and completed within at most two or three minutes after completing spatulation of the materials to secure the best results in the ultimate morphology and compressive strength of the set cement.

From the foregoing description, it will be seen that I have conceived and provided a highly efficient and specifically novel process applicable to most of the commonly used dental cement ingredients requiring combination of a powdered ingredient or mixture and liquid, fulfilling the objects of my invention heretofore stated, and overcoming the uncertain and inaccurate results which are now common with the technique and methods now employed. The use of my process on the part of the dentist or laboratory technician requires no measurement of the respective ingredients; no operation of syringe or other moving parts for dispelling gauged quantities of materials and assures the user that both the unstable liquid ingredient and the powdered ingredients have been unaffected, undiluted or modified by any contact with air gases or vapor prior to the time when the respective containers are instantly opened and the contents dispelled.

It will of course be understood that various equivalencies may be utilized for the respective small containers herein described for the two units (liquid and powder) employed and that other media than an atmosphere of an inert gas may be substituted in the packaging, provided air, moisture and vapor is excluded from the ingredients as they are packaged, all within the scope of my invention.

What is claimed is:
1. The method of producing and applying highly efficient dental cements to obtain and assure accurate chemical balance of the ingredients utilized, which consists in packaging predetermined, small, unitary quantities of a dry powdered material of the class comprising essentially zinc oxide, oxyphosphate of zinc, and alumino silicates and mixtures of said first two aforementioned ingredients, said packaging being carried out with the use of predetermined, readily openable closed containers of a material impervious to moisture, vapor and gases, packaging small unitary quantities of a very unstable liquid comprising mainly an aqueous solution of phosphoric acid into readily opened, flexible closed containers from which the liquid may be instantly expelled by squeezing, the measured quantity of liquid in each container being such as to assure accurate chemical balance of powder and liquid ingredients when later thoroughly admixed, said last mentioned containers being impervious to moisture, vapors and gases and of a material which will resist cracking or deterioration in storage at temperatures varying from $+200°$ F., to $-20°$ F., for a period exceeding one year, and subsequently quickly opening and expelling the contents from said powder containers upon a smooth mixing surface and immediately thereafter opening and expelling contiguous to the expelled powder, the liquid from the liquid containers by squeezing, immediately thoroughly admixing liquid and powder expelled as by spatulation, and thereafter within a range of one to three minutes applying said mixture to the prepared cavities, roots or fabricated restorations.

2. The steps recited in preceding claim 1 further characterized by successively and continuously packaging said liquid substance in said predetermined units within plastic strip ampules constructed of fluorocarbon.

References Cited

UNITED STATES PATENTS

| 1,971,843 | 8/1934 | Alilaire | 206—47 |
| 2,527,991 | 10/1950 | Greenberg | 206—47 |
| 3,139,181 | 6/1964 | Kobernick | 206—47 X |

TRAVIS S. McGEHEE, *Primary Examiner.*